No. 858,318. PATENTED JUNE 25, 1907.
G. B. & J. H. YOUNG.
CORN POPPER.
APPLICATION FILED FEB. 20, 1907.

2 SHEETS—SHEET 1.

WITNESSES
Edward Thorpe

INVENTORS
George B. Young
Joseph H. Young
BY
Munn & Co
ATTORNEYS

No. 858,318. PATENTED JUNE 25, 1907.
G. B. & J. H. YOUNG.
CORN POPPER.
APPLICATION FILED FEB. 20, 1907.
2 SHEETS—SHEET 2.
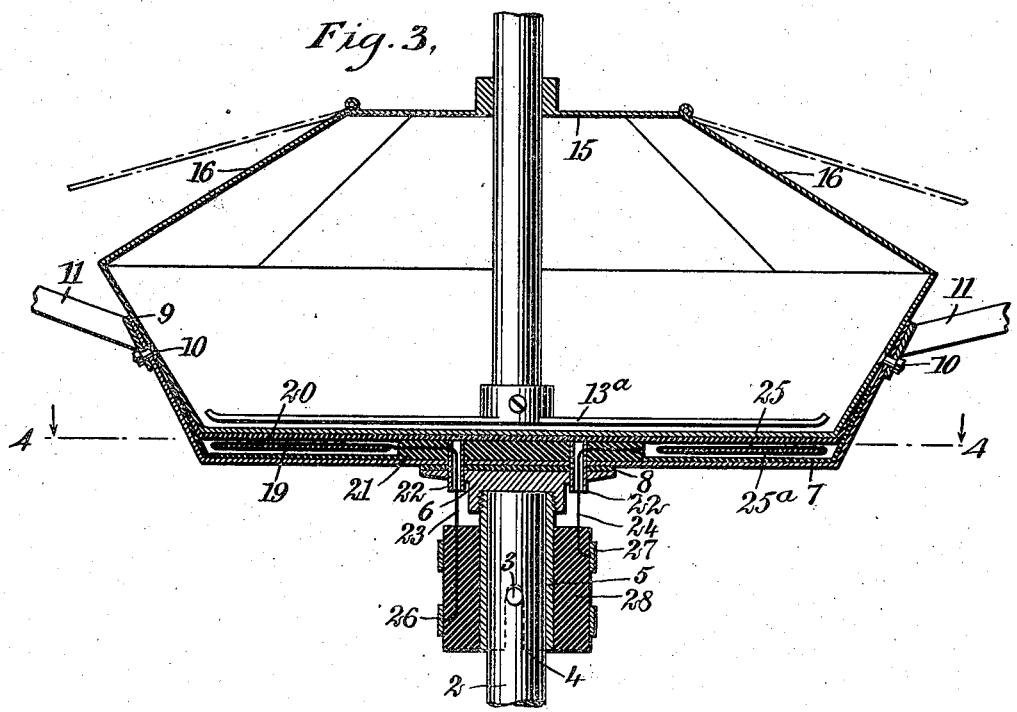
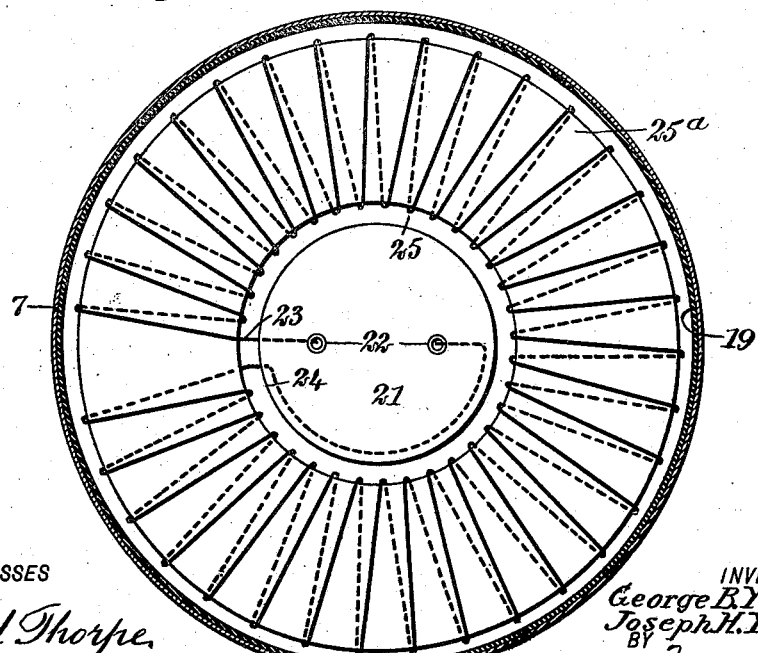
WITNESSES
Edward Thorpe
INVENTORS
George B. Young
Joseph H. Young
BY
Munn & Co
ATTORNEYS

UNITED STATES PATENT OFFICE.

GEORGE B. YOUNG AND JOSEPH H. YOUNG, OF EL PASO, TEXAS.

CORN-POPPER.

No. 858,318. Specification of Letters Patent. Patented June 25, 1907.

Original application filed November 30, 1906, Serial No. 345,690. Divided and this application filed February 20, 1907. Serial No. 358,352.

*To all whom it may concern:*

Be it known that we, GEORGE B. YOUNG and JOSEPH H. YOUNG, both citizens of the United States, and residents of El Paso, in the county of El Paso and State of Texas, have invented a new and Improved Corn-Popper, of which the following is a full, clear, and exact description.

The subject matter of this application is directed to improvements in corn-poppers, divided from our co-pending application filed November 30, 1906, Serial No. 345,690. The invention, although more especially designed for popping corn, is not limited to this particular use, as it may be used advantageously in roasting peanuts, chestnuts and as a cooking device generally.

The object of the invention, primarily, is to provide for the cooking, roasting, etc. in a manner that the same may be carried out uniformly; provision being made for the automatic release of the corn from the popper should the pan in which it is contained fill to the overflowing point.

Reference is to be had to the accompanying drawings forming a part of this specification, in which similar characters of reference indicate corresponding parts in all the figures.

Figure 1:
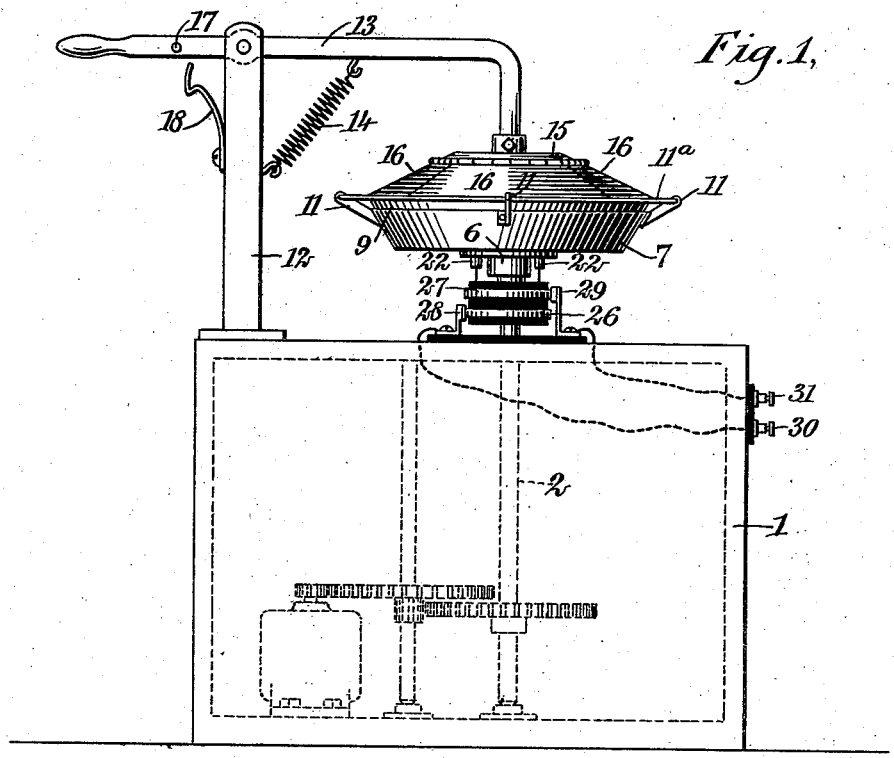
Figure 2:
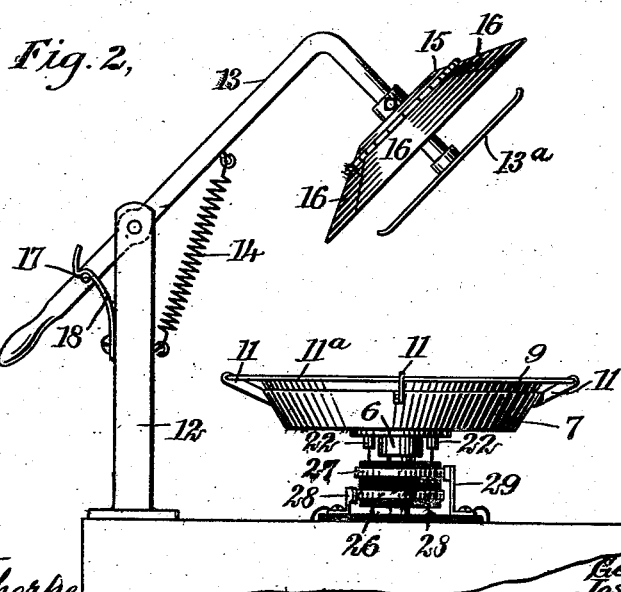

Figure 1 is a side elevation of one embodiment of our invention; Fig. 2 is a fragmentary view similar to Fig. 1, showing the pan and lid separated; Fig. 3 is a central, vertical section through the lid and pan, showing in dotted outline the position assumed by sectors of the lid as when the pan fills with corn to the overflowing point, and Fig. 4 is a horizontal section substantially on the line 4—4 of Fig. 3, looking in the direction of the arrow.

In carrying out the invention we employ a support 1, preferably in the nature of a box, in which is contained a motor intergeared with a vertical driving shaft 2, as shown in dotted outline in Fig. 1. This shaft 2, which is journaled in the support 1, projects a short distance above the top thereof, where it is provided with a transverse pin 3, adapted to engage in the slots 4 of a thimble 5, as shown in Fig. 3, holding said thimble against relative rotary movement on the shaft. The upper end of the thimble 5 is threaded into a center-plate 6, which is secured to the under face of a sheet metal cup 7, a sheet of material, 8 being interposed between the plate and cup to insulate them from each other.

Seated or telescoped within the cup 7 is a pan 9 of similar construction, and forming with the cup a heating chamber therebetween for containing a suitable heating device hereinafter referred to. The pan and cup are both preferably constructed of aluminium and are rigidly secured together by screws or bolts 10 which also pass through brackets 11 arranged about the cup, the latter supporting a wire 11$^a$ encircling the pan and forming a handle adapting both the cup and pan to be lifted from the end of the shaft 2 for emptying the pan or for any other purpose.

Fixed to the support 1 at one side of the shaft 2, is a standard 12, to the upper end of which is pivotally connected a hand-lever 13, normally forced in the direction of the pan by a spring 14 connecting the lever with the standard 12. The end of the lever 13 overhanging the pan 9 is downwardly-turned and has rigidly fixed thereto at its extremity an agitating device consisting of transverse arms 13$^a$ and also fixed thereabove a lid 15, which is preferably shaped as the frustum of a cone, with hingedly connected sectors 16, said sectors adapted to move outwardly to the dotted position in Fig. 3 should the pan become filled with popped corn to the overflowing point. For holding the lid 15 in an elevated position in order that access to the pan may be obtained, is provided a projection or pin 17 extending from the lever 13 at the opposite side of its pivotal connection, said pin being adapted to be engaged by a spring hook 18 carried by the standard 12, maintaining the lever and lid as illustrated in Fig. 2.

The compartment or chamber between the cup 7 and pan 9 is lined with sheets of insulating material 19 and 20, respectively, said material being preferably mica, as also a disk 21 arranged at the center of said chamber. This disk, as also the parts 6 and 8, is pierced by insulating nipples 22, through which pass conductors 23 and 24 leading to the terminal points of a heating coil 25, said coil being spirally wrapped around a ring of mica or other insulating material 25$^a$, arranged in the compartment between the cup and pan. The conductors 23 and 24, as shown in Fig. 3, lead from contact rings 26 and 27, respectively, surrounding a cylinder 28 of wood or other insulating material, said cylinder being rigidly fixed to the thimble 5. The rings 26 and 27, when the pan is seated over the shaft 2, are engaged by brushes 28 and 29, respectively, the brushes being coupled by suitable conductors to any source of electrical supply, through binding-posts 30 and 31.

It is obvious from the construction described that when the shaft 2 is caused to revolve, the pan and attached mechanism when engaged therewith, will be likewise driven. During this operation the coil 25 is heated from a suitable source of electrical supply, causing the cooking or roasting to take place uniformly throughout, through the action of the stirring or agitating device 13$^a$. If the material in the pan be popcorn, the corn, after popping, will remain in the pan until the same is filled to the overflowing point, after which it will raise the sectors 16 and permit the corn to fall from the pan.

Although we have described the preferred embodiment of the invention in detail, in order that the construction and operation might be fully understood, we regard the precise construction as not material and that the scope of the invention is limited by the scope of the annexed claims.

Having thus described our invention we claim as new and desire to secure by Letters Patent:

1. In a device of the character described, in combination, a cup and a pan telescoped together providing a heating chamber therebetween, and means for revolving said pan.

2. In a device of the character described, in combination, a vertical shaft, a cup removably seated over the shaft and held against relative rotation thereon, a pan telescoped within the cup thus providing a heating chamber therebetween, and means for revolving said shaft.

3. In a device of the character described, in combination, a vertical shaft, a cup having a thimble adapting it to be removably connected with the shaft, a pan seated in the cup thus providing a heating chamber therebetween, and a stirring device co-operating with the pan, for the purpose described.

4. In a device of the character described, in combination, a cup and a pan telescoped together, providing a heating chamber therebetween, a conical lid for said pan provided with hingedly connected sectors, a stirring device, and means for revolving said stirring device and pan relatively to each other.

5. In a device of the character described, in combination, a pan, means for heating said pan, a lever having a downwardly-turned end overhanging said pan, and a lid and a stirring device attached to said downwardly-turned end.

6. In a device of the character described, in combination, a pan, means for heating said pan, a lever having a downwardly-turned end overhanging the pan, a lid attached to said downwardly-turned end, means for forcing said lid in contact with the pan, and means for holding said lid in an elevated position.

7. In a device of the character described, in combination, a pan, means for heating said pan, a hand lever having a downwardly-turned end overhanging said pan, a stirring device and a lid secured to said overhanging end, and means for holding the lid and pan in contact.

8. In a device of the character described, in combination, a vertical shaft, means for revolving said shaft, a pan, means adapting the pan to be removably attached to the shaft, and means for heating said pan.

In testimony whereof we have signed our names to this specification in the presence of two subscribing witnesses.

GEORGE B. YOUNG.
JOSEPH H. YOUNG.

Witnesses:
C. S. PICKRELL,
AURROLA F. YOUNG.